(12) United States Patent
Park et al.

(10) Patent No.: US 11,299,123 B2
(45) Date of Patent: Apr. 12, 2022

(54) FRONT AIRBAG DEVICE FOR VEHICLE

(71) Applicant: HYUNDAI MOBIS CO., LTD., Seoul (KR)

(72) Inventors: Hae Kwon Park, Yongin-si (KR); Seok Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/096,428

(22) Filed: Nov. 12, 2020

(65) Prior Publication Data
US 2021/0146875 A1 May 20, 2021

(30) Foreign Application Priority Data
Nov. 18, 2019 (KR) .................. 10-2019-0148057

(51) Int. Cl.
| | | |
|---|---|---|
| *B60R 21/2338* | (2011.01) | |
| *B60R 21/231* | (2011.01) | |
| *B60R 21/205* | (2011.01) | |
| *B60R 21/015* | (2006.01) | |
| *B60R 21/00* | (2006.01) | |
| *B60R 21/01* | (2006.01) | |

(52) U.S. Cl.
CPC .... *B60R 21/2338* (2013.01); *B60R 21/01554* (2014.10); *B60R 21/205* (2013.01); *B60R 21/231* (2013.01); *B60R 2021/0004* (2013.01); *B60R 2021/0009* (2013.01); *B60R 2021/0023* (2013.01); *B60R 2021/0032* (2013.01); *B60R 2021/0048* (2013.01); *B60R 2021/01238* (2013.01); *B60R 2021/23382* (2013.01); *B60R 2021/23384* (2013.01)

(58) Field of Classification Search
CPC . B60R 21/2338; B60R 21/205; B60R 21/231; B60R 21/20; B60R 21/01554; B60R 2021/23384; B60R 2021/0048; B60R 2021/0009; B60R 2021/23382; B60R 2021/0004; B60R 2021/01238; B60R 2021/0032; B60R 2021/0023; B60N 2002/0272
USPC ................. 280/743.2, 743.1, 730.1, 732
See application file for complete search history.

(56) References Cited

U.S. PATENT DOCUMENTS

| | | | | |
|---|---|---|---|---|
| 6,808,205 | B2 * | 10/2004 | Hawthorn | ........... B60R 21/2338 280/743.2 |
| 9,272,685 | B2 * | 3/2016 | Fischer | ................ B60R 21/239 |
| 2001/0035637 | A1 * | 11/2001 | Thomas | ................ B60R 21/276 280/736 |

FOREIGN PATENT DOCUMENTS

| | | | |
|---|---|---|---|
| KR | 10-2007-0091111 A | | 9/2007 |
| KR | 20120020966 A | * | 3/2012 |

* cited by examiner

*Primary Examiner* — Keith J Frisby
(74) *Attorney, Agent, or Firm* — DLA Piper LLP (US)

(57) ABSTRACT

A front airbag device for a vehicle is proposed. In the front airbag device, an airbag cushion is mounted in front of a passenger and is expanded to be positioned at a front surface of the passenger, a triangular main tether and a triangular support tether are positioned inside the airbag cushion, and one side of the main tether and one side of the support tether are spaced apart from each other and are coupled to the airbag cushion in a sewn manner, so that the main tether and the support tether support a front surface portion of the airbag cushion to protect a front surface of the passenger.

10 Claims, 8 Drawing Sheets

FRONT AIRBAG DEVICE FOR VEHICLE

CROSS REFERENCE TO RELATED APPLICATION

The present application claims priority to Korean Patent Application No. 10-2019-0148057, filed Nov. 18, 2019, the entire contents of which is incorporated herein for all purposes by this reference.

BACKGROUND OF THE INVENTION

Field of the Invention

The present invention relates generally to a front airbag device for a vehicle and, more particularly, to a front airbag device for a vehicle, the front airbag device being capable of protecting a passenger when a front seat is in a normal seating mode or a relaxation mode.

Description of the Related Art

Recently, with the development of autonomous vehicles, it is predicted that the interior of the vehicles will also be changed a lot. As the autonomous vehicles are realized, a part that is expected to be changed the most in the interior is a vehicle seat.

Traditional vehicle seats may perform only passive movements, such as height adjustment in a fixed position facing the front of the vehicle or seatback angle adjustment. However, as self-driving becomes possible, a driver is freed from driving, thereby enabling a relaxation mode in which a passenger lies backward by adjusting the angle of a seatback in not only a passenger seat and a back seat, but also in a driver seat.

The conventional airbag is mounted in front of a passenger and may protect a front surface of the passenger only in a normal seating mode of the front seat, but may not protect the front surface of the passenger in the relaxation mode in which the passenger lies backward by adjusting the angle of the seatback. Therefore, the airbag mounted in front of the passenger protects a front surface of the passenger by a tether mounted inside the airbag cushion to protect the front surface of the passenger in the normal seating mode. When the front seat is changed to the relaxation mode, the tether inside the airbag cushion is cut to increase the volume of the airbag cushion to protect the front surface of the passenger.

However, the conventional vehicle airbag has one linear tether inside the airbag cushion. Whereby, the front surface of the airbag cushion is not evenly supported and the front surface of the passenger is not efficiently protected when a vehicle inclination crash occurs.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose an airbag mounted and expanded in front of a passenger. Wherein, the airbag of the present invention protects a front surface of the passenger when a vehicle crash occurs in a normal seating mode of a front seat or in a relaxation mode in which the passenger lies backward by adjusting the angle of a seatback of the front seat, and the airbag reduces injuries of the passenger when a vehicle crash occurs in the normal seating mode of the front seat.

In order to achieve the above objectives, according to one aspect of the present invention, there is provided a front airbag device for a vehicle. The front airbag device may include: an airbag cushion configured to be expanded toward a front passenger by pressure of airbag gas generated when an inflator explodes; and a main tether and a support tether, which may be connected to the airbag cushion to maintain a shape of the expanded airbag cushion. Wherein the main tether and the support tether may be configured as plane tethers that may be unfolded when the airbag cushion is expanded and support a front surface portion of the airbag cushion within a predetermined area.

The front airbag device may include: a wire cutter provided on one side of the inflator; and a tether wire connecting the wire cutter to the main tether. Wherein the wire cutter may be configured to be operated to cut the tether wire under a control of a vehicle controller only when a vehicle crash occurs in a situation in which a front seat is in a relaxation mode.

The vehicle controller may determine the relaxation mode of the front seat by receiving a signal of a seatback angle sensor provided in the front seat.

The main tether may be configured to be unfolded in a triangular shape when the airbag cushion is expanded. The main tether may be configured such that one vertex of the triangular shape may be connected to the tether wire and one side thereof facing the vertex may be coupled to the airbag cushion.

The support tether may be configured to be unfolded in a triangular shape when the airbag cushion is expanded. The support tether may be configured such that one vertex of the triangular shape may have a ring through which the tether wire may pass and one side thereof facing the ring may be coupled to the airbag cushion.

The main tether and the support tether may be configured to be respectively unfolded in triangular shapes when the airbag cushion is expanded, one side of the triangular main tether and one side of the triangular support tether may be spaced apart from each other and be coupled to the airbag cushion in a sewn manner, and one side of the main tether and one side of the support tether may be configured to be unfolded in one of a vertical direction and a horizontal direction to the airbag cushion.

The ring of the support tether may be configured to be moved along the tether wire by external force acting on the airbag cushion when the airbag cushion is expanded.

In a situation in which the airbag cushion is expanded but the tether wire is not cut, the front surface portion of the airbag cushion may be expanded with a center protrusion protruding toward the front passenger, side protrusions at opposite sides, and two valleys connecting the opposite side protrusions to the center protrusion in a wave shape. The main tether and the support tether may be respectively connected to the two valleys.

When a frontal crash occurs, a head of the front passenger may be brought into contact with the center protrusion and then be moved to one of the valleys at one side, so that opposite sides of the head may be supported by the center protrusion and one of the side protrusions.

In a situation of an inclination crash, a head of the front passenger may be inserted into one of the valleys between the center protrusion and one of the side protrusions, the head of the front passenger inserted in the valley may be supported by the support tether that is unfolded in a plane, and when the head of the front passenger is supported by the support tether, the support tether may absorb impact while being moved along the tether wire.

In the situation in which the front seat is in the relaxation mode, when the airbag cushion is expanded and the tether wire is cut, the front surface portion may protrude toward the front passenger, and as a protruding length of the airbag cushion is increased due to the front surface portion thereof protruding toward the front passenger, initial restraint of the front passenger may be strengthened.

As described above, according to the embodiment of the present invention, the airbag cushion 10 is mounted in front of the passenger 600, and is expanded to be positioned at a front surface of the passenger 600. The triangular main tether 20 and the triangular support tether 30 are positioned inside the airbag cushion 10, and one side 21 of the main tether 20 and one side 31 of the support tether 30 are spaced apart from each other and are coupled to the airbag cushion 10 in a sewn manner to support the front surface portion 11 of the airbag cushion 10. Due to the wave shape composed of the valleys 11c of the front surface portion 11 coupled to the tethers, the center protrusion 11a, and the side protrusions 11b of the front surface portion 11, when a vehicle frontal crash occurs, the head 610 of the passenger 600 is brought into contact with the center protrusion 11a of the front surface portion 11, and the head 610 of the passenger 600 is rotated and inserted into one of the valleys 11c of the front surface portion 11. Accordingly impact force of the head 610 is changed into rotational force as the head 610 is rotated, so that a head injury, which occurs most often in vehicle crashes, can be reduced.

In addition, the tether wire 60 is connected to one vertex 22 of the main tether 20, and one vertex 32 of the support tether 30 is connected to the ring 50 through which the tether wire 60 passes. Through the structure in which the ring 50 is moved along the tether wire 60, the head 610 of the passenger 600, which is loaded diagonally to the left and the right in a vehicle inclination crash, can be efficiently protected.

In addition, the tether wire 60 connecting the main tether 20 to the wire cutter 70 is cut by the wire cutter 70 when the front seat 500 is in the relaxation mode, and the front surface portion 11 of the airbag cushion 10 protrudes toward the passenger 600, so that a volume of the airbag cushion 10 is increased to strengthen initial restraint of the front surface of the passenger 600 in the relaxation mode. Accordingly, the passenger 600 can be efficiently protected.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
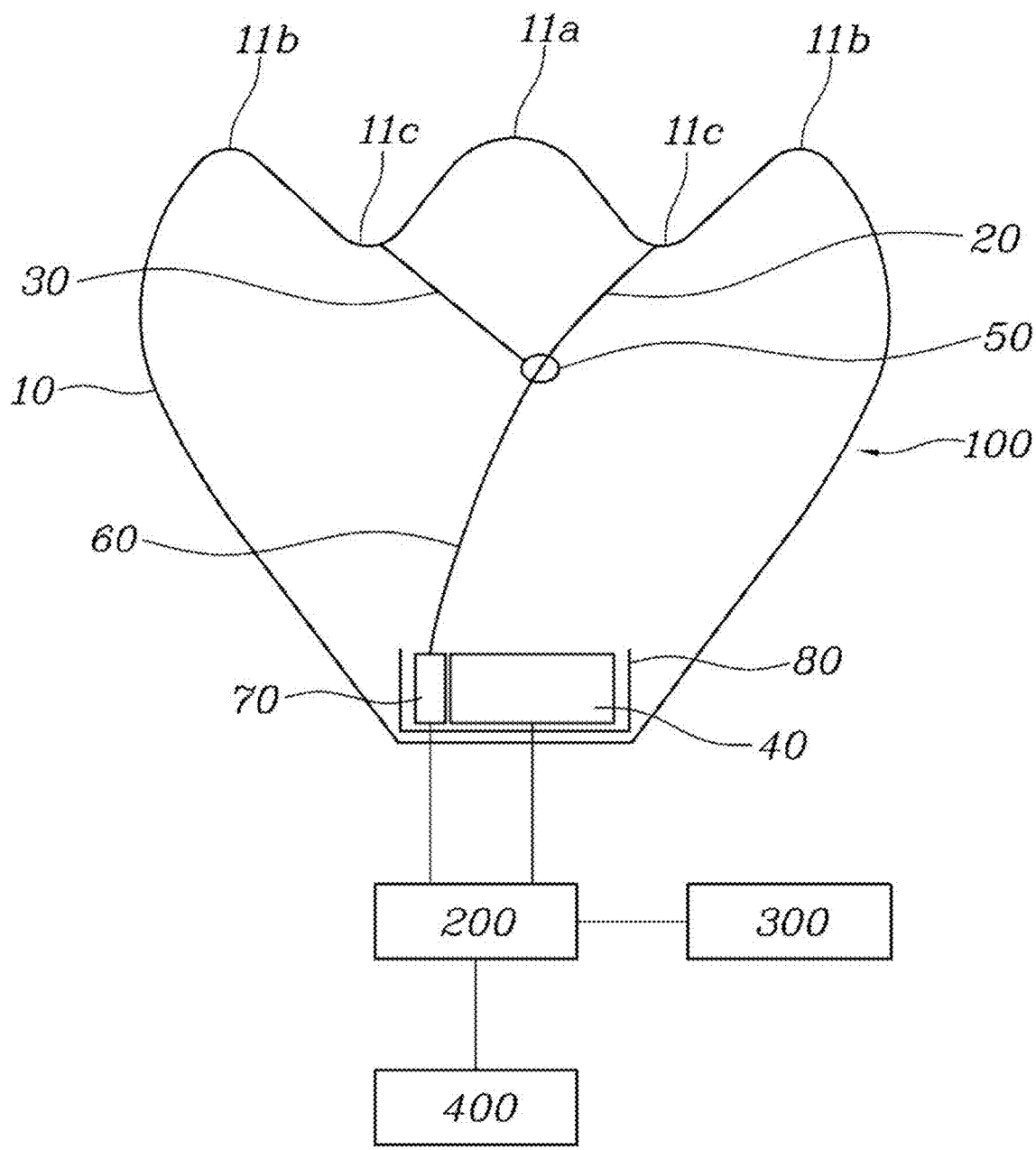
FIG. 1 is a perspective view showing a front airbag device for a vehicle according to an embodiment of the present invention.
Figure 2:
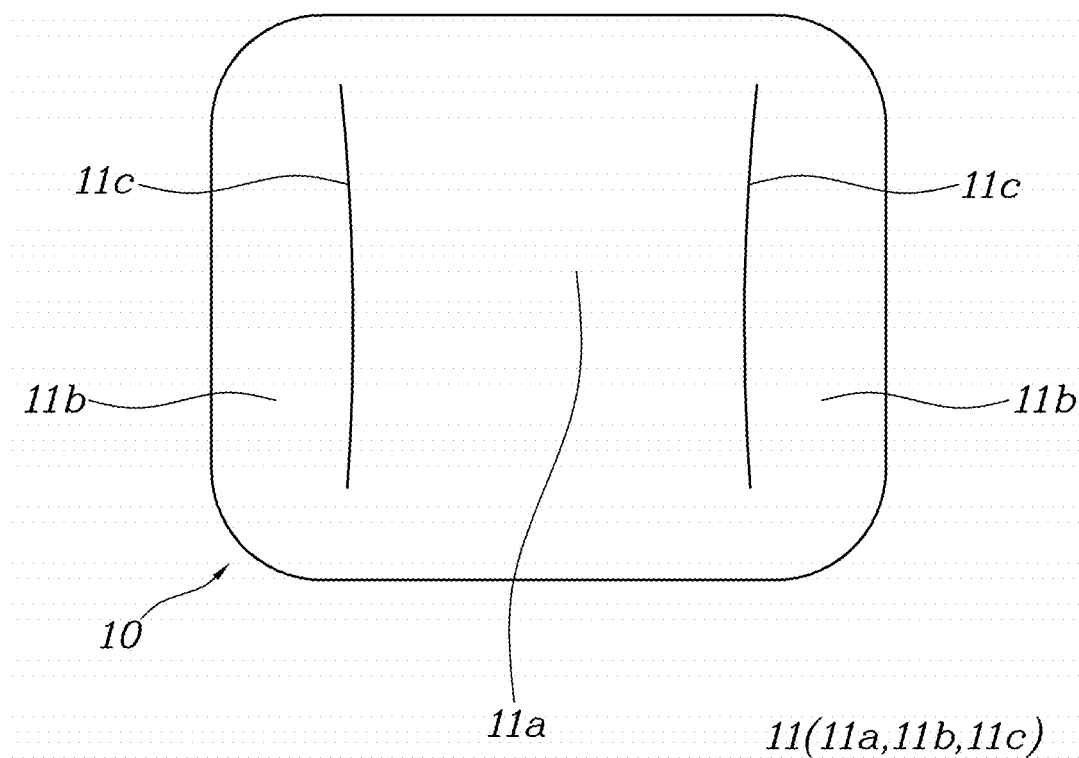
FIG. 2 is a front view showing an airbag cushion of components of the front airbag device for a vehicle according to the embodiment of the present invention.
Figure 3:
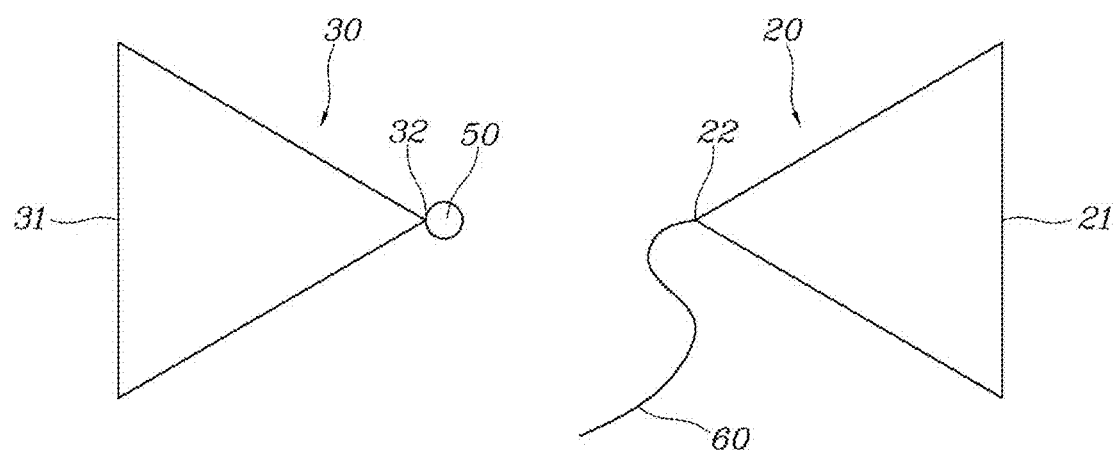
FIG. 3 is a perspective view showing a tether of the components of the front airbag device for a vehicle according to the embodiment of the present invention.
Figure 4:
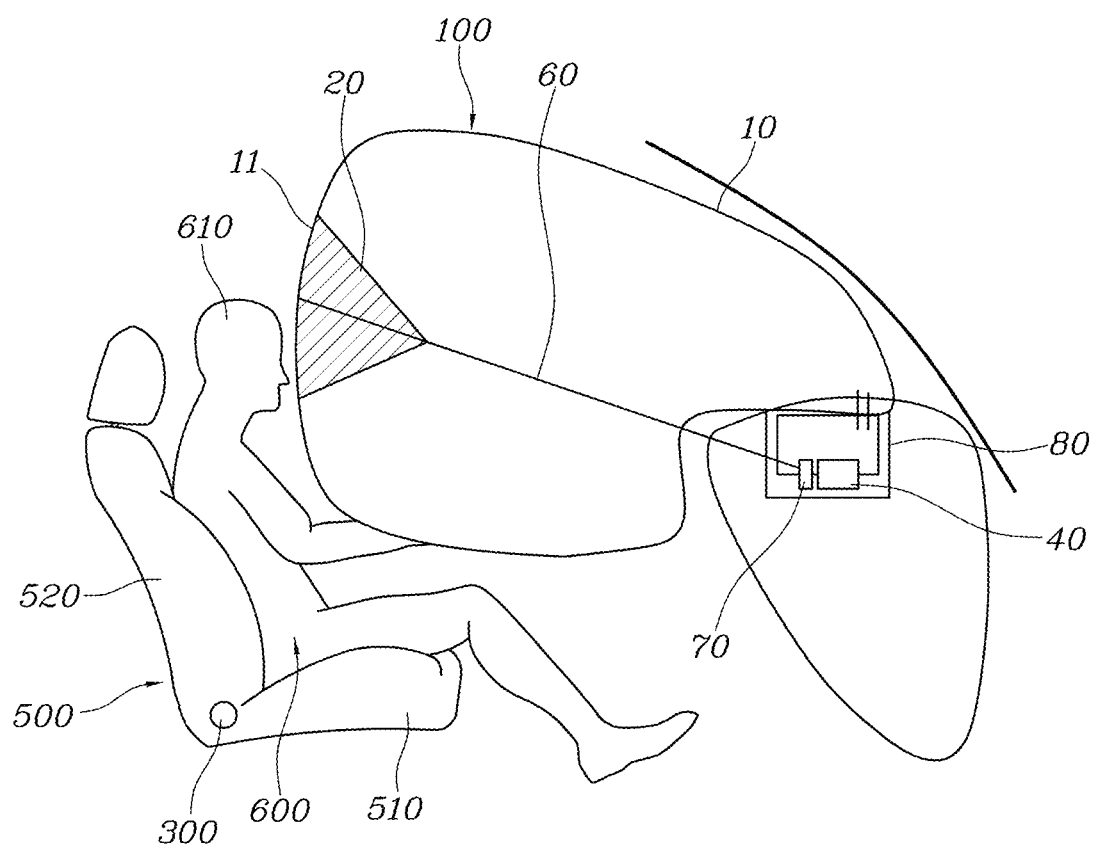
FIG. 4 is a side view showing the front airbag device for a vehicle according to the embodiment of the present invention when the front airbag device is expanded in a normal seating mode of a passenger.

Hereinbelow, a front airbag device 100 for a vehicle according to an exemplary embodiment of the present invention will be described with reference to the accompanying drawings.

As shown in FIGS. 1 to 8, the front airbag device 100 for a vehicle is mounted in front of a passenger 600 and is expanded while an airbag cushion 10 and a tether are coupled to each other. In addition, the front airbag device 100 for a vehicle further includes an inflator 40 mounted together with the airbag cushion 10 to unfold the airbag cushion 10, a ring 50 and a tether wire 60 connected to the tether, and a wire cutter 70 connected to the tether wire 60 and being capable of cutting the tether wire 60 in response to seating positions of a front seat 500. Furthermore, the airbag cushion 10, the tether, the ring 50, the tether wire 60, the inflator 40, and the wire cutter 70 are stored inside an airbag housing 80.

According to the embodiment of the present invention, the front airbag device 100 for a vehicle may be applied to both an autonomous vehicle and a general manually-driven vehicle that is not an autonomous vehicle. In the case of the autonomous vehicle, since the passenger 600 does not have to drive himself, a driver's seat of the front seat 500 may be changed to a relaxation mode or a reversing mode in which the front seat faces a back seat, together with a passage seat of the front seat 500. Accordingly, the embodiment of the present invention may be mounted to both the driver's seat and the passenger seat of the front seat 500 of the autonomous vehicle. In the case of the general manually-driven vehicle, since only a passenger seat of the front seat 500 may be changed to the relaxation mode, the front airbag device 100 for a vehicle according to the embodiment of the present invention may only be mounted to the passenger seat.

In detail, the front airbag device 100 for a vehicle of the embodiment of the present invention is expanded toward the front passenger 600 by pressure of airbag gas generated when the inflator 40 explodes. A main tether 20 and a support tether 30 are connected to the airbag cushion 10 to maintain a shape of the expanded airbag cushion 10. The main tether 20 and the support tether 30 are configured as plane tethers that are unfolded when the airbag cushion 10 is expanded and support a front surface portion 11 of the airbag cushion 10 by a predetermined area.

Therefore, the airbag cushion 10 is expanded in a vehicle crash and supports movement of an upper body of the passenger 600 forward and absorbs impact. The main tether 20 and the support tether 30 mounted inside the airbag cushion 10 support the front surface portion 11 of the airbag cushion 10, and are configured to be positioned in a front surface of the passenger 600 when the airbag cushion 10 is expanded. In addition, during the vehicle crash, as a crash sensor 400 inputs a signal to a vehicle controller 200 and the vehicle controller 200 inputs a signal to the inflator 40, the inflator 40 explodes and injects the airbag gas into the airbag cushion 10, so that the airbag cushion 10 may be expanded.

The wire cutter 70 is installed at one side of the inflator 40, and the tether wire 60 connects the main tether 20 to the wire cutter 70.

Therefore, when the airbag cushion 10 is expanded, the main tether 20 is connected to the wire cutter 70 and the tether wire 60 and supports the front surface portion 11 of the airbag cushion 1, so that the front surface portion 11 of the airbag cushion 10 forms a predetermined area.

The vehicle controller 200 receives a signal of a seatback angle sensor 300 provided in the front seat 500 to determine the relaxation mode of the front seat 500. The wire cutter 70 is operated to cut the tether wire 60 under a control of the vehicle controller 200 only when a vehicle crash occurs in a situation where the front seat 500 is in the relaxation mode. In addition, when a vehicle crash occurs, the vehicle controller 200 allows the tether wire 60 to be cut by sending the wire cutter 70 a cutting signal of the tether wire 60 while unfolding the airbag cushion 10.

The front seat 500 of the vehicle includes a seat cushion 510 supporting a lower body of the passenger 600 and a seatback 520 supporting an upper body of the passenger 600. The seatback 520 may be rotated back and forth with respect to the seat cushion 510 through a reclining device to adjust an angle thereof, so the seatback 520 may be changed to the relaxation mode.

According to the embodiment of the present invention, since the front airbag device may be applied to both an autonomous vehicle and a general manually-driven vehicle that is not an autonomous vehicle, the vehicle controller 200 has different criteria for determining the relaxation mode of the front seat 500 when the vehicle is an autonomous vehicle or a general manually-driven vehicle.

In the case of the autonomous vehicle, the passenger 600 presses a seat mode change button to change the front seat 500 from the normal seating mode to the relaxation mode. In the case of the general manually-driven vehicle, the passenger 600 at the passenger seat of the front seat 500 operates a seat lever of the passenger seat or a seat switch thereof so that an angle of the seatback 520 is adjusted and the passenger seat is changed to the relaxation mode.

Therefore, in the autonomous vehicle, the vehicle controller 200 determines that the front seat 500 has changed to the relaxation mode according to a signal of the seat mode change button. In the general manually-driven vehicle, the seatback angle sensor 300 provided in the front seat 500 detects the angle of the seatback 520 and inputs the signal to the vehicle controller 200, and the vehicle controller 200 determines that the front seat 500 has changed to the relaxation mode, thus allowing the vehicle controller 200 to control the operation of the wire cutter 70 when a vehicle crash occurs.

When the vehicle controller 200 determines that the front seat 500 is not on the relaxation mode, the vehicle controller 200 operates only the inflator 40 when the crash signal is input from the crash sensor 400.

When the airbag cushion 10 is expanded, the main tether 20 and the support tether 30 are unfolded into triangular shapes. One vertex 22 of the triangular main tether 20 is connected to the tether wire 60, and one side 21 facing the vertex 22 is coupled to the airbag cushion 10. One vertex 32 of the triangular support tether 30 has the ring 50 through which the tether wire 60 passes, and one side 31 thereof facing the ring 50 is coupled to the airbag cushion 10. In addition, the side 21 of the triangular main tether 20 and the side 31 of the triangular support tether 30 are spaced apart from each other and coupled to the airbag cushion 10 in a sewn manner. The side 21 of the main tether 20 and the side 31 of the support tether 30 are unfolded in one of a vertical direction and a horizontal direction to the airbag cushion 10.

The sides 21 and 31 of the main tether 20 and the support tether 30 that are configured as the plane tethers of the triangular shapes are connected to the front surface portion 11 of the airbag cushion 10 in line-contact. Accordingly, the main tether 20 and the support tether 30 of the plane tethers may more effectively support the airbag cushion 10 than when linear tethers are connected to the airbag cushion 10 in point-contact.

In addition, the main tether 20 and the support tether 30 are spaced apart from each other and connected to the front surface portion 11 of the airbag cushion 10 in the vertical or horizontal direction. Accordingly, when the airbag cushion 10 is expanded, the main tether 20 and the support tether 30 support the front surface portion 11, so that the front surface portion 11 is positioned in the front surface of the passenger 600.

When the airbag cushion 10 is expanded and the front seat 500 is in the normal seating mode in which the tether wire 60 is not cut, the front surface portion 11 of the airbag cushion 10 is configured to be expanded with a center protrusion 11*a* protruding toward the front passenger 600, side protrusions 11*b* at opposite sides of the center protrusion 11*a*, and two valleys 11*c* connecting the center protrusion 11*a* to the side protrusions 11*b* in a wave shape. The main tether 20 and the support tether 30 are respectively connected to the two valleys 11*c*. When a frontal crash occurs, the head 610 of the front passenger 600 is brought into contact with the center protrusion 11*a* and then is moved to one of the valleys 11*c*, so that opposite sides of the head 610 are supported by the center protrusion 11*a* and one of the side protrusions 11*b*.

Figure 6:
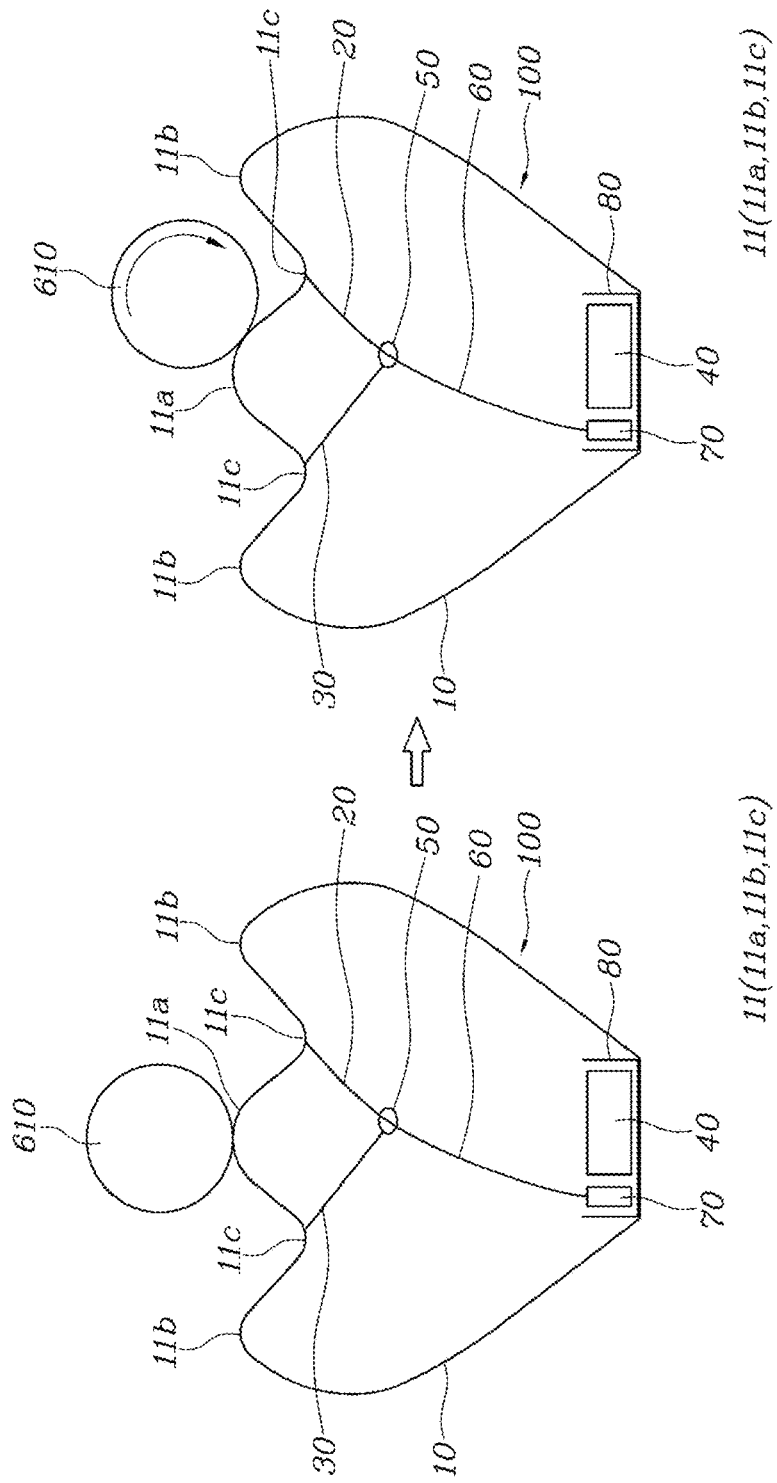
FIG. 6 is a side section view showing the front airbag device for a vehicle according to the embodiment of the present invention when frontal collision occurs in the normal seating mode of the passenger.

Referring to FIG. 6, when the frontal crash occurs in a situation in which the front seat 500 is in the normal seating mode, the tether wire 60 is not cut while the airbag cushion 10 is expanded, and the sides 21, 31 of the main tether 20 and the support tether 30 support the valleys 11*c* of the airbag cushion 10. The front surface portion 11 of the airbag cushion 10 and the head 610 of the passenger 600 are brought into contact with each other at the center protrusion 11*a* of the front surface portion 11, and the head 610 of the passenger 600 is rotated and inserted into one of the valleys 11*c* of the front surface portion 11, so that impact force of the head 610 is changed into rotational force as the head 610 is rotated, thereby reducing a head injury, which occurs most often in vehicle crashes.

In addition, when the airbag cushion 10 is expanded, the ring 50 of the support tether 30 is configured to be moved along the tether wire 60 in response to external force acting on the airbag cushion 10. When an inclination crash occurs, the head 610 of the front passenger 600 is inserted into one of the valleys 11*c* between the center protrusion 11*a* and one of the side protrusions 11*b*, and the head 610 of the front passenger 600 inserted in the valley 11*c* is supported by the support tether 30 unfolded into a plane. When the head 610 of the front passenger 600 is supported by the support tether 30, the support tether 30 absorbs impact while being moved along the tether wire 60.

Figure 7:
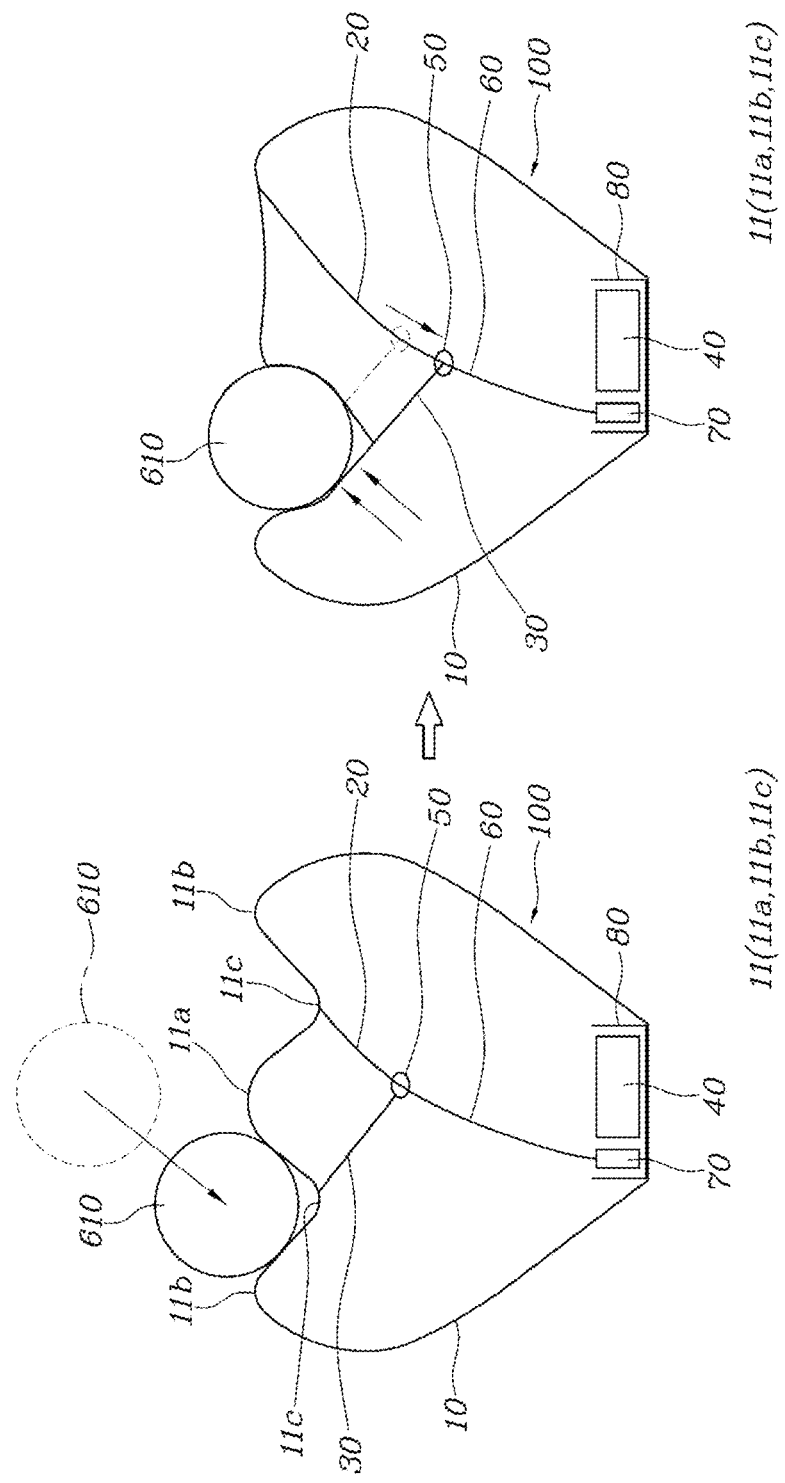
FIG. 7 is a side section view showing the front airbag device for a vehicle according to the embodiment of the present invention when inclination collision occurs in the normal seating mode of the passenger.

Referring to FIG. 7, when an inclination crash occurs in a situation where the front seat 500 is in the normal seating mode, the head 610 of the passenger 600 is loaded diagonally to the left and the right, thereby being weak to impact protection. In order to prepare for the problem, since the ring 50 may be moved along the tether wire 60, the tether of the plane shape may support the head 610 of the passenger 600 to prevent the head 610 of the passenger 600 from being moved diagonally to the right and the left in the front surface portion 11 of the airbag cushion 10. Whereby, the head injury of the passenger 600 may be reduced even in the situation where an inclination crash occurs.

In a situation where the front seat 500 is in the relaxation mode, when the airbag cushion 10 is expanded and the tether wire 60 is cut, the front surface portion 11 protrudes toward the front passenger 600. Due to the front surface portion 11 protruding toward the front passenger 600, a protruding length the airbag cushion 10 is increased from L1 to L2, thereby strengthening initial restraint of the passenger 600.

Figure 5:
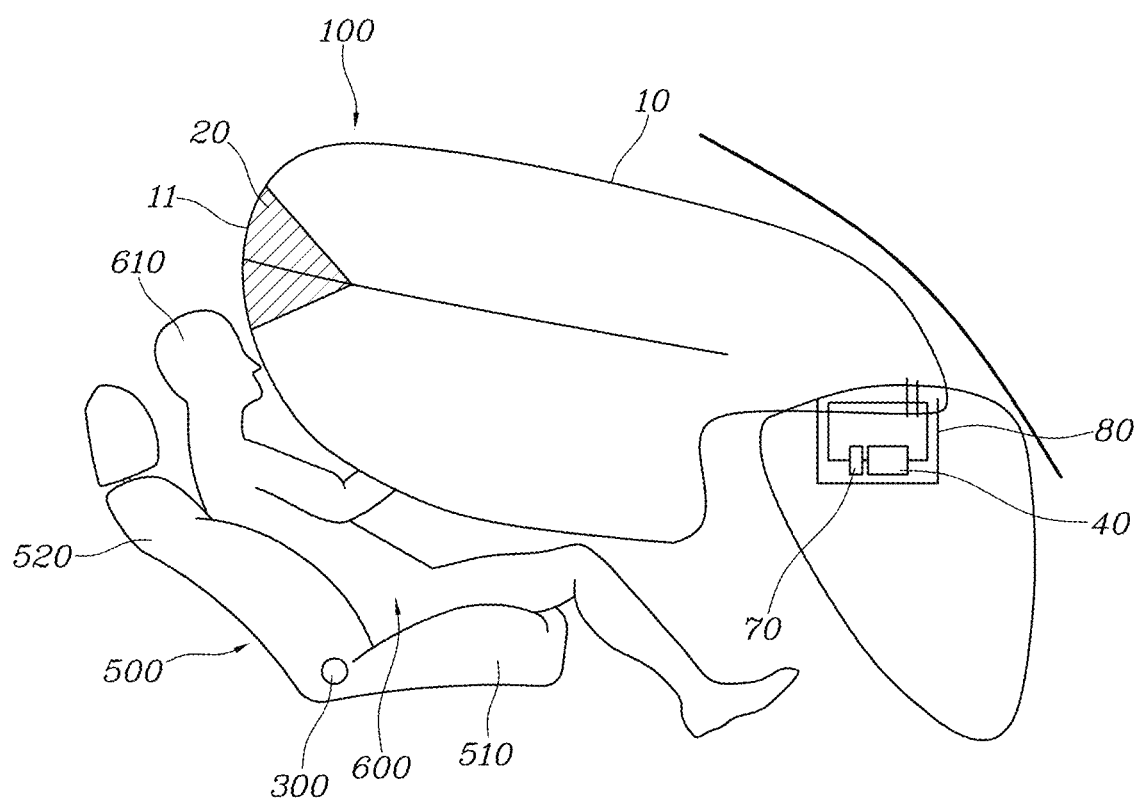
FIG. 5 is a side view showing the front airbag device for a vehicle according to the embodiment of the present invention when the front airbag device is expanded in a relaxation mode of the passenger.
Figure 8:
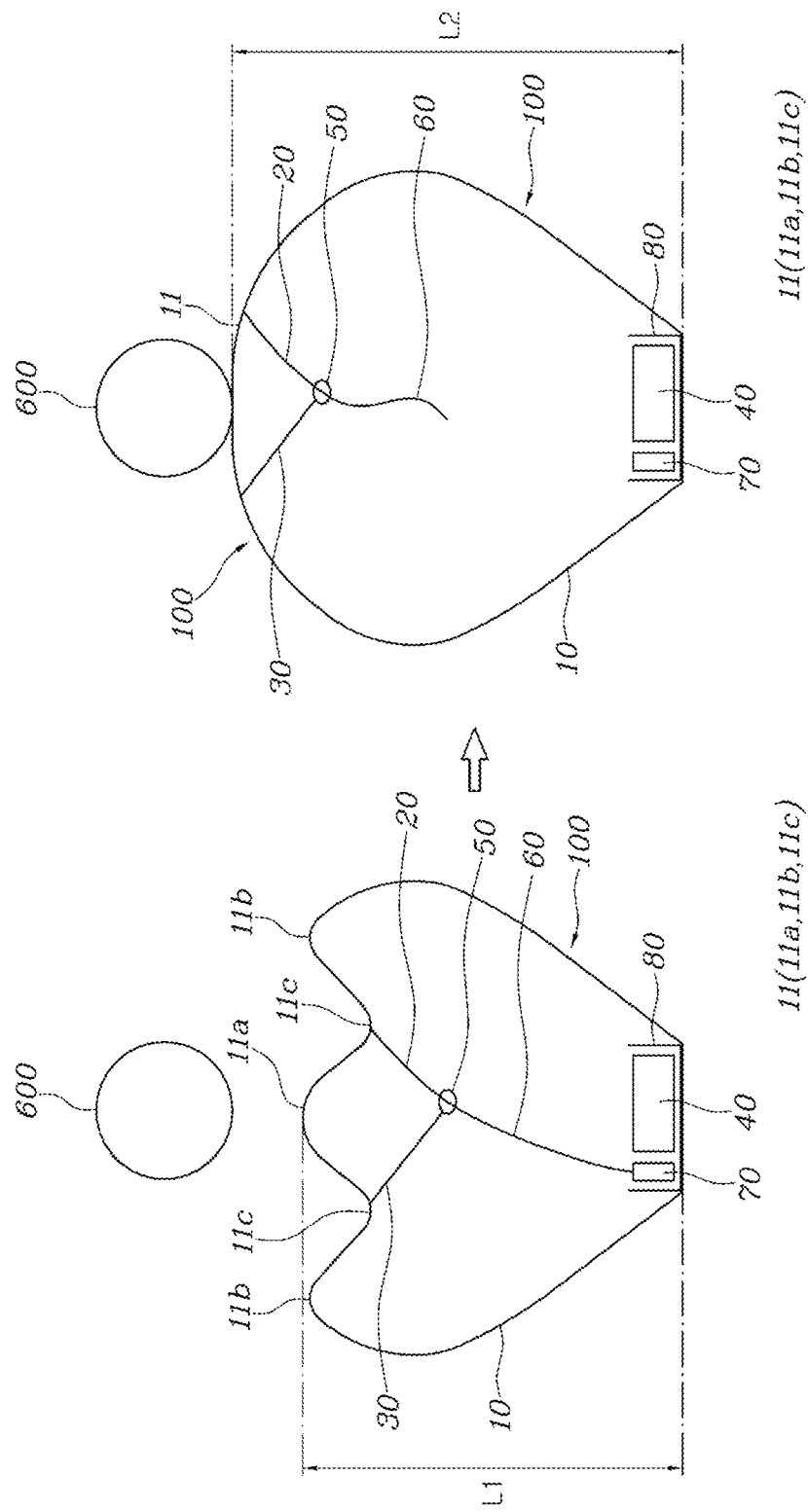
FIG. 8 is a perspective view showing the front airbag device for a vehicle according to the embodiment of the present invention when the front airbag device is expanded in the relaxation mode of the passenger.

Referring to FIGS. 5 and 8, in the situation where the front seat 500 is in the relaxation mode, when the tether wire 60 is not cut and the airbag cushion 10 is expanded while the tether supports the front surface portion 11 of the airbag cushion 10, the airbag cushion 10 is not brought into contact with a front surface of the passenger 600. Therefore, the wire cutter 70 cuts the tether wire 60 connected thereto to allow the length of the front surface portion 11 of the airbag cushion 10 from L1 to L2 and to increase the volume thereof, so that the initial restraint of the front surface of the passenger 600 in the relaxation mode is strengthened and the passenger 600 is efficiently protected.

As described above, according to the embodiment of the present invention, the airbag cushion 10 is mounted in front of the passenger 600, and is expanded to be positioned at the front surface of the passenger 600. The triangular main tether 20 and the triangular support tether 30 are positioned inside the airbag cushion 10, and any one side 21 of the main tether 20 and any one side 31 of the support tether 30 are spaced apart from each other and are coupled to the airbag cushion 10 in a sewn manner to support the front surface portion 11 of the airbag cushion 10. Due to the wave shape composed of the valleys 11c of the front surface portion 11 coupled to the tethers, the center protrusion 11a, and the side protrusions 11b of the front surface portion 11, when the vehicle frontal crash occurs, the head 610 of the passenger 600 is brought into contact with the center protrusion 11a of the front surface portion 11, and the head 610 of the passenger 600 is rotated and inserted into one of the valleys 11c of the front surface portion 11. Accordingly impact force of the head 610 is changed into rotational force as the head 610 is rotated, thereby reducing a head injury, which occurs most often in vehicle crashes.

In addition, the tether wire 60 is connected to the vertex 22 of the main tether 20, and the vertex 32 of the support tether 30 is connected with the ring 50 through which the tether wire 60 passes. Through the structure in which the ring 50 is moved along the tether wire 60, the head 610 of the passenger 600, which is loaded diagonally to the left and the right in the vehicle inclination crash, may be efficiently protected.

In addition, the tether wire 60 connecting the main tether 20 to the wire cutter 70 is cut by the wire cutter 70 when the front seat 500 is in the relaxation mode. Therefore, the front surface portion 11 of the airbag cushion 10 protrudes toward the passenger 600 and a volume of the airbag cushion 10 is increased to strengthen the initial restraint of the front surface of the passenger 600 in the relaxation mode, so that the passenger 600 may be efficiently protected.

Although a preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A front airbag device for a vehicle, the front airbag device comprising:
   an airbag cushion configured to be expanded toward a front passenger by pressure of airbag gas generated when an inflator explodes;
   a main tether and a support tether, which are connected to the airbag cushion to maintain a shape of the expanded airbag cushion,
   wherein the main tether and the support tether are configured as plane tethers that are unfolded when the airbag cushion is expanded and support a front surface portion of the airbag cushion within a predetermined area;
   a wire cutter provided on one side of the inflator; and
   a tether wire connecting the wire cutter to the main tether;
   wherein the wire cutter is configured to be operated to cut the tether wire under a control of a vehicle controller only when a vehicle crash occurs in a situation in which a front seat is in a relaxation mode.

2. The front airbag device of claim 1, wherein the vehicle controller determines the relaxation mode of the front seat by receiving a signal of a seatback angle sensor provided in the front seat.

3. The front airbag device of claim 1, wherein the main tether is configured to be unfolded in a triangular shape when the airbag cushion is expanded, the main tether being configured such that one vertex of the triangular shape is connected to the tether wire and one side thereof facing the vertex is coupled to the airbag cushion.

4. The front airbag device of claim 1, wherein the support tether is configured to be unfolded in a triangular shape when the airbag cushion is expanded, the support tether being configured such that one vertex of the triangular shape has a ring through which the tether wire passes and one side thereof facing the ring is coupled to the airbag cushion.

5. The front airbag device of claim 4, wherein the ring of the support tether is configured to be moved along the tether wire by external force acting on the airbag cushion when the airbag cushion is expanded.

6. The front airbag device of claim 1, wherein the main tether and the support tether are configured to be respectively unfolded in triangular shapes when the airbag cushion is expanded;
   one side of the triangular main tether and one side of the triangular support tether are spaced apart from each other and are coupled to the airbag cushion in a sewn manner; and
   one side of the main tether and one side of the support tether are configured to be unfolded in one of a vertical direction and a horizontal direction to the airbag cushion.

7. The front airbag device of claim 1, wherein in a situation in which the airbag cushion is expanded but the tether wire is not cut, the front surface portion of the airbag cushion is expanded with a center protrusion protruding toward the front passenger, side protrusions at opposite sides, and two valleys connecting the opposite side protrusions to the center protrusion in a wave shape; and
the main tether and the support tether are respectively connected to the two valleys.

8. The front airbag device of claim 7, wherein when a frontal crash occurs, a head of the front passenger is brought into contact with the center protrusion and then is moved to one of the valleys at one side, so that opposite sides of the head are supported by the center protrusion and one of the side protrusions.

9. The front airbag device of claim 7, wherein in a situation of an inclination crash, a head of the front passenger is inserted into one of the valleys between the center protrusion and one of the side protrusions;
the head of the front passenger inserted in the valley is supported by the support tether that is unfolded in a plane; and
when the head of the front passenger is supported by the support tether, the support tether absorbs impact while being moved along the tether wire.

10. The front airbag device of claim 1, wherein in the situation in which the front seat is in the relaxation mode, when the airbag cushion is expanded and the tether wire is cut, the front surface portion protrudes toward the front passenger; and
as a protruding length of the airbag cushion is increased due to the front surface portion thereof protruding toward the front passenger, initial restraint of the front passenger is strengthened.

\* \* \* \* \*